United States Patent Office 3,637,633
Patented Jan. 25, 1972

3,637,633
PEROXY COMPOUNDS
David Rodney Dixon and John Andrew Cunningham, Welwyn Garden City, England, assignors to Imperial Chemical Industries Limited, London, England
No Drawing. Filed Apr. 15, 1969, Ser. No. 816,409
Claims priority, application Great Britain, Apr. 24, 1968, 19,427/68
Int. Cl. C08f 3/30, 1/60
U.S. Cl. 260—92.8 W          6 Claims

ABSTRACT OF THE DISCLOSURE

A mixture of a diacyl peroxide, a peroxydicarbonate, and an acyl peroxycarbonate is made by the action of an inorganic peroxide on a mixture of a chloroformate and an acid chloride. The mixture of peroxy compounds can be used as catalysts for the polymerisation of vinyl chloride.

---

This invention relates to peroxy compounds and in particular to peroxy compounds suitable for use as catalysts in the free radical polymerisation of vinyl chloride.

Diacyl peroxides, i.e. compounds of the formula $$R_1\text{—CO.O.O.CO.—}R_1$$

where $R_1$ is a hydrocarbon or substituted hydrocarbon residue are well known as catalysts for the polymerisation of vinyl chloride. Lauroyl peroxide is one example of this type of catalyst that has been widely used for vinyl chloride polymerisation. The reactivity of this type of catalyst depends on the nature of the hydrocarbon residue $R_1$; lauroyl peroxide being a relatively slow acting catalyst. In order to obtain short polymerisation reaction times using lauroyl peroxide, large amounts of catalyst are required or the polymerisation temperature has to be increased. Both these alternatives are often undesirable since the use of higher catalyst concentrations adversely affects the thermal stability of the polymer i.e. ability to withstand elevated temperatures without discolouration while the use of higher polymerisation temperatures causes a reduction in the molecular weight of the polymer with the consequent, generally adverse, affect on the physical properties of the polymer.

The more reactive diacyl peroxides, such as diisobutyryl peroxide, $(CH_3)_2CH.CO.O.O.CO.CH.(CH_3)_2$, are more difficult to handle, often requiring refrigeration facilities for storage. In addition reactive diacyl peroxides such as diisobutyryl peroxide also cause difficulties in the polymerisation reaction, because they exhaust at the usual polymerisation temperatures before polymerisation has proceeded to a high conversion of monomer to polymer. The use of higher quantities of catalyst to overcome exhaustion problems is not desirable as the catalyst cost would be undesirably high and also the use of higher quantities of catalyst adversely affects the properties of the polymer, in particular its heat stability i.e. resistance to withstand thermal degradation or decomposition. Thus lower temperatures with the consequent increase in reaction time and polymer molecular weight, are necessary to obtain a high conversion.

Peroxydicarbonates, i.e. compounds of the formula $R_2.O.CO.O.O.CO.O.R_2$ where $R_2$ is a hydrocarbon or substituted hydrocarbon residue have also been proposed, for example in United Kingdom patent specification 926,376, as catalysts for vinyl chloride polymerisation. While in many respects peroxydicarbonates, for example, diisopropyl- or diethyl-peroxydicarbonate give satisfactory results, the polymerisation reaction time could still advantageously be reduced. It has been proposed in Specification 926,376 to use a mixture of a diacyl peroxide such as lauroyl peroxide and a peroxydicarbonate such as diisopropyl peroxydicarbonate to overcome difficulties associated with exhaustion of the peroxydicarbonate when using polymerisation temperatures above 55° C.

We have found that fast reaction times, without catalyst exhaustion, are obtained if a mixture of a peroxydicarbonate and an active diacyl peroxide such as diisobutyryl peroxide are used, but that even faster reaction times are obtainable using certain three component catalyst systems consisting of a diacyl peroxide, a peroxydicarbonate and an acyl peroxycarbonate.

The acyl peroxycarbonates have the formula $$R_1.CO.O.O.CO.O.R_2$$

where $R_1$ and $R_2$, which may be the same or different, are hydrocarbon or substituted hydrocarbon residues. These acyl peroxycarbonates are described and claimed in United Kingdom patent specification 870584. The method of preparing the acyl peroxycarbonates described in that specification involves reacting a peroxycarboxylic acid having the formula $R_1.CO.O.OH$ with a halo-formate, usually the chloroformate, of the formula $R_2.O.CO.X$ where X is a halogen atom, preferably in the presence of a base.

We have found that a particularly useful catalyst system can be made by reacting a mixture of an acid halide and a haloformate with an inorganic peroxide, preferably hydrogen peroxide, preferably in the presence of a base.

Accordingly we provide a method of making a mixture of peroxy compounds comprising reacting a mixture of an acid halide of the formula $R_1CO.X$ and a haloformate of the formula $R_2O.CO.X$ with an inorganic peroxide, where $R_1$ and $R_2$, which may be the same or different, are hydrocarbon or substituted hydrocarbon residues and X is a halogen atom, said mixture of the acid halide and haloformate containing from 1 to 60% by weight of the acid halide.

We prefer that the reaction is carried out in the presence of a strong base. Suitable bases are the hydroxides of the alkali or alkaline earth metals. The amount of base is preferably approximately stoichiometrically equally to or in slight excess of the amount of inorganic peroxide.

By this process a mixture of the three peroxy compounds: $R_1CO.O.O.CO.R_1$, $R_2O.CO.O.O.CO.O.R_2$ and $R_1CO.O.O.CO.O.R_2$ is believed to be produced.

The hydrocarbon residues $R_1$ and $R_2$ are preferably alkyl groups, particularly those containing 2 to 12 carbon atoms. While they are preferably unsubstituted, useful catalysts may also be obtained by the use of compounds in which a functional group, is a substituent of the hydrocarbon residue in the α-position. Examples of groups $R_1$ and $R_2$ include ethyl, propyl, iso-propyl, n-butyl, t-butyl, capryl, 2-ethyl hexyl, and undecyl.

Particularly suitable acid halides are isobutyryl chloride, and lauroyl chloride, while particularly suitable haloformates are ethyl and isopropyl chloroformates.

The mixture of peroxy compounds is preferably made by reaction of the acid halide and haloformate with the peroxide in aqueous medium.

In order to obtain the highest yields of the mixture of peroxy compounds from the reaction, the temperature used should be low, preferably between +10° C. and −10° C. and at a dilution ratio of water to the mixture of haloformate and acid halide of from 100:1 to 5:1, preferably 50:1 to 8:1. If higher dilutions than 100:1 are used, low yields are obtained, while if lower dilutions than 5:1 are used, difficulty is encountered in controlling the reaction temperature and runaway reactions are liable to occur.

The yield of peroxy compounds may also be increased by conducting the reaction in the presence of a surfactant, particularly an anionic surfactant such as sodium lauryl sulphate or sodium dodecyl benzene sulphonate. The use of 1 to 5% by weight, based on the weight of the water, of the surfactant gives particularly good results.

The preparation of the mixture of peroxy compounds is illustrated by the following examples.

EXAMPLE 1

1.65 gm. of sodium hydroxide were dissolved in 34 ml. of distilled water and placed in a glass flask and cooled, with stirring, to 0° C. 2.5 ml. of 100 vol. hydrogen peroxide were then added. A total of 4.25 ml. of a mixture of 30% by weight of isobutyryl chloride and 70% by weight of isopropyl chloroformate was slowly run in to the stirred flask at such a rate that the temperature of the contents of the flask did not exceed 2° C. The total time taken for the addition was about 30 minutes. The organic phase was then extracted with petroleum ether and the yield calculated from the analysis of the total peroxide content. The yield was 85% of theoretical. Examination of the product by thin layer chromatography using a mixture of 16 parts by weight of 60–80 petrol and 1 part by weight of ethyl acetate as the developing solvent and a 1% by weight alcoholic solution of amino-N:N-dimethyl aniline hydrochloride as detecting agent, indicated the presence of three peroxidic components. Two of these components were shown, by comparison with authentic samples, to be diisobutyryl peroxide and diisopropyl peroxydicarbonate.

The infrared spectrum of the product was similar to that of a mixture of diisobutyryl peroxide and diisopropyl peroxydicarbonate except for the addition of a single peak at 8.1µ.

EXAMPLES 2 TO 7

Example 1 was repeated but maintaining the solution temperature of the contents of the flask at different levels during the addition of the chloroformate/acid chloride mixture. The results are shown in Table I.

TABLE I

| Example | Temperature (° C.) | Yield (percent of theoretical) |
| --- | --- | --- |
| 2 | 38 | 50.4 |
| 3 | 25 | 57.2 |
| 4 | 14 | 68.5 |
| 5 | 7 | 75.9 |
| 6 | 3 | 82.1 |
| 7 | 1 | 85.1 |

EXAMPLES 8–13

Example 1 was repeated using different amounts of water. The temperature of the flask contents was maintained at 1° C.

The results are shown in Table II.

TABLE II

| Example | Amount of water used (ml.) | Dilution ratio | Yield (percent of theoretical) |
| --- | --- | --- | --- |
| 8 | 21.2 | 5:1 | (¹) |
| 9 | 34 | 8:1 | 87.1 |
| 10 | 64 | 15:1 | 85.1 |
| 11 | 127 | 30:1 | 79.8 |
| 12 | 170 | 40:1 | 71.2 |
| 13 | 212 | 50:1 | 65.1 |

¹ The yield was low as the temperature could not be controlled and rose to 10° C.

As stated hereinbefore the mixtures of peroxy compounds are particularly useful as catalysts for vinyl chloride polymerisation. We therefore provide a process for the production of vinyl chloride polymers wherein vinyl chloride is polymerised alone or with minor amounts of a comonomer in the presence of a mixture of peroxy compounds, made by reacting a mixture of an acid halide of the formula $R_1CO.X$ and a haloformate of the formula $R_2.O.CO.X$ with an inorganic peroxide, where $R_1$ and $R_2$, which may be the same or different, are hydrocarbon or substituted hydrocarbon residues and X is a halogen atom, said mixture of acid halide and haloformate containing 1 to 60% by weight of the acid halide.

The polymerisation is generally conducted at temperatures within the range 45 to 75° C. The amounts of catalyst used are normally within the range 0.005 to 2% by weight of the monomers used, particularly 0.01 to 0.5% by weight.

The mixture of peroxy compounds is particularly useful for the granular or suspension polymerisation process wherein the monomeric vinyl chloride is polymerised while suspended with the aid of a dispersing agent which is generally a protective colloid, in the form of minute droplets in an aqueous medium.

The mixture of peroxy compounds should be derived from a mixture of the haloformate and acid halide containing from 1 to 60%, preferably 5 to 55% by weight of the acid halide. If a higher percentage of acid halide is used then, with the acid halides giving the more active di-acyl peroxides, catalyst exhaustion occurs thereby giving long reaction times or low conversion of monomer to polymer, while with the acide halide giving the less active peroxides the catalyst mixture offers no advantage over the peroxydicarbonate used alone. If less than 1% of the acid halide is used, little or no improvement over the use of a peroxy dicarbonate alone or a mixture of the peroxydicarbonate and peroxide is obtained. When using the acid halides that give less active acyl peroxides such as lauroyl peroxide and conducting the polymerisation at the higher end of the temperature range, for example at 55–75° C. the amount of acid halide is preferably in the range 30 to 55% by weight of the mixture.

We have found that with the acid halides giving active peroxides such as diisobutyryl peroxide, the mixture of acid halide and haloformate preferably contains 10 to 40% by weight, particularly 15 to 33% by weight of the acid halide and conducting the polymerisation at the lower end of the temperature range for example 45 to 55° C.

The vinyl chloride may be homopolymerised or copolymerised with minor amounts of at least one comonomer such as vinyl acetate, vinylidene chloride, alklyl acrylates for example ethyl acrylate, olefines such as ethylene or propylene, and vinyl ethers. We prefer that where a copolymer is formed the mixture of vinyl chloride and comonomer or comonomers contains at least 80% by weight of vinyl chloride.

The mixture of peroxy compounds is preferably prepared as required for the polymerisation reaction to avoid the necessity of storage and the consequential risk of peroxide decomposition and hence reduction in catalyst activity. When prepared in an aqueous medium, there is no need to separate the mixture of the peroxy compounds from the water if the catalyst system is to be used in an aqueous suspension polymerisation process. In such a case the requisite amount of the aqueous medium containing the mixture of peroxy compounds can be charged to the polymerisation vessel.

The use of the mixture of peroxy compounds as polymerisation catalysts is illustrated by the following examples. Examples 14 to 16 are comparative while Examples 17 to 25 illustrate the invention.

EXAMPLE 14

A stainless steel autoclave of 5 litres capacity provided with a stirrer was charged with 2400 ml. of distilled water, 2.9 gm. of a partially hydrolysed polyvinyl acetate (dispersing agent) and 1.2 gm. of diisopropylperoxydicarbonate. The autoclave was then evacuated, purged with nitrogen and reevacuated to remove residual air, and then 1450 gm. of vinyl chloride were added. The autoclave was then heated to 50° C. to effect polymerisation. The temperature of 50° C. was maintained constant and the autoclave pressure remained substantially constant for some hours. The pressure then started to drop sharply and when it had fallen by 40 p.s.i. the residual monomer was released by venting the autoclave. The time taken from first reaching the temperature of 50° C. to venting was 7½ hours, and the conversion of monomer to polymer was about 90% by weight.

The polymer was then separated from the slurry by filtration, washing and drying.

EXAMPLE 15

Example 14 was repeated using a solution of 1.2 gm. of diisobutyryl peroxide in petroleum ether as catalyst in place of the diisopropyl peroxydicarbonate. The autoclave pressure remained constant for some hours and then dropped very slowly. After 12 hours reaction time the autoclave was vented but the conversion of monomer to polymer was only 58% by weight.

Repeats of this process but venting at different times indicated severe catalyst exhaustion, the conversion being 53% by weight after only 2 hours polymerisation but 90% by weight conversion being achieved only after 16 hours polymerisation.

EXAMPLE 16

Example 14 was repeated using a mixture of 0.6 gm. of diisopropyl peroxydicarbonate and 0.6 gm. of diisobutyryl peroxide as catalyst. The time taken to achieve 90% conversion was about 8 hours. By comparison with Examples 14 and 15 it is seen that this mixture offers no advantage over the use of diisopropylperoxydicarbonate alone, presumably again because of catalyst exhaustion.

EXAMPLES 17–22

Example 16 was repeated but using as catalyst 1.2 gm. of a mixture of peroxy compounds made by the process set out in Example 1, but using different ratios of isobutyryl chloride to isopropyl chloroformate.

The ratios and reaction times are set out in Table III.

TABLE III

| Example | Percent by weight isobutyryl chloride [1] | Time from reaching 50° C. to venting [2] |
|---|---|---|
| 17 | 9 | 6 hours, 10 minutes. |
| 18 | 16 | 5 hours, 30 minutes. |
| 19 | 20 | 5 hours, 20 minutes. |
| 20 | 25 | 5 hours, 5 minutes. |
| 21 | 33 | 5 hours, 20 minutes. |
| 22 | 50 | 7 hours, 10 minutes. |

[1] In mixture of isobutyrylchloride and isopropyl chloroformate.
[2] At a pressure drop of 40 p.s.i. which corresponds to 90% by weight conversion.

EXAMPLE 23

Example 1 was repeated but the organic phase was not separated from the aqueous medium. Assuming an 85% yield as in Example 1, the amount of the flask contents to give a total peroxy compound content of 1.2 gm. was computed and this amount was used in place of the 1.2 gm. of diisopropylperoxydicarbonate in a polymerisation process as set out in Example 14. The time to give a monomer to polymer conversion of about 90% was 5 hours 5 minutes.

EXAMPLE 24

The procedure of Example 23 was repeated but using an aqueous solution containing 2% by weight of sodium dodecyl benzene sulphonate in place of the distilled water used in the preparation of the peroxy compound mixture. Because of the presence of the surfactant, the organic phase could not be extracted by petroleum ether and so the same amount of the flask contents as was used in Example 23 was used to catalyse the polymerisation. In this case the time taken to give a monomer to polymer conversion of about 90% was 4 hours, 10 minutes.

The reduced reaction time obtained in this example, compared with Example 23, shows that a greater amount of the peroxy compound mixture was formed when the preparation was conducted in the presence of a surfactant. Similar results were obtained when a mixture of 1200 gm. of vinyl chloride and 250 gm. of vinyl acetate were used.

EXAMPLE 25

Example 14 was repeated using a polymerisation temperature of 70° C. and 0.51 gm. diisopropylperoxydicarbonate as catalyst. Because of catalyst exhaustion it took 14 hours to reach 90% conversion. Increasing the concentration of catalyst had an adverse effect on the colour of the polymer.

When the above polymerisation was repeated using 0.87 gm. of lauroyl peroxide in place of the diisopropylperoxydicarbonate the time to reach 90% conversion was about 8 hours. Increasing the concentration of lauroyl peroxide in an attempt to speed up the reaction had an adverse effect on the colour of the polymer.

In a third polymerisation using .31 gm. of diisopropylperoxydicarbonate in admixture with .44 gm. of lauroyl peroxide the time to reach 90% conversion was about 5 hours.

In accordance with the invention a mixture of catalysts was prepared following the general procedure of Example 1 but using a mixture of 0.56 gm. of lauroyl chloride and 0.43 gm. of isopropyl chloroformate, and stoichiometric amounts of sodium hydroxide and hydrogen peroxide. The yield was about 85% of theoretical and when the mixture was used in place of the mixture of 0.31 gm. of diisopropylperoxydicarbonate and 0.44 gm. of lauroyl peroxide in the previous experiment, it gave a time to 90% conversion of 4½ hours.

We claim:

1. A process for the production of vinyl chloride polymers wherein a monomeric material selected from vinyl chloride and mixtures of vinyl chloride and at least one comonomer selected from vinyl acetate, vinylidene chloride, alkyl acrylates, olefines and vinyl ethers, said mixture containing at least 80% by weight of vinyl chloride is polymerised in the presence of a mixture of three peroxy compounds of the formulas

and

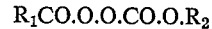

said three-component mixture being obtained by reacting a mixture of an acid halide of the formula $R_1CO.X$ and a haloformate of the formula $R_2.O.CO.X$ with an inorganic peroxide, where $R_1$ and $R_2$, are selected from hydrocarbon residues and substituted hydrocarbon residues and X is a halogen atom, said mixture of acid halide and haloformate containing from 1 to 60% by weight of the acid halide.

2. A process according to claim 1 wherein the polymerization is conducted in an aqueous medium.

3. A process according to claim 2 wherein the mixture of peroxy compounds is made in aqueous medium and is introduced into the polymerisation reactor without removing the aqueous medium from the peroxy compound mixture.

4. A process according to claim 1 wherein the vinyl chloride is polymerised at a temperature in the range 45 to 75° C.

5. A process according to claim 4 wherein the mixture of peroxy compounds is made from a mixture of a haloformate and lauroyl chloride containing from 30 to 55% by weight of lauroyl chloride and the polymerisation is conducted at a temperature in the range 55 to 75° C.

6. A process according to claim 4 wherein the mixture of peroxy compounds is made from a mixture of a haloformate and isobutyryl chloride containing from 15 to 33% by weight of isobutyryl chloride and the polymerisation is conducted at a temperature in the range 45 to 55° C.

References Cited

UNITED STATES PATENTS 3,022,281   2/1962   Smith _____ 260—92.8 W
3,022,282   2/1962   Marous et al. ____ 260—92.8 W JOSEPH L. SCHOFER, Primary Examiner J. A. DONAHUE, JR., Assistant Examiner U.S. Cl. X.R.

260—86.3, 87.1, 87.5 C, 87.5 G, 92.8 R